United States Patent Office 3,435,007
Patented Mar. 25, 1969

3,435,007
MERCURY DERIVATIVE OF GLUTARIMIDE-β-ACETIC ACID
Nicolas A. Starkovsky, Weston, and Horst G. Langer, Cochituate, Mass., assignors to The Dow Chemical Company, Midland, Mich., a corporation of Delaware
No Drawing. Filed Dec. 24, 1964, Ser. No. 421,086
Int. Cl. C08g 33/20; C07f 3/14
U.S. Cl. 260—78          15 Claims

ABSTRACT OF THE DISCLOSURE

Novel mercury derivatives of glutarimide-β-acetic acid. The invention also includes a preparatory process comprising reacting an organomercury compound or a reactive inorganic mercury compound, with glutarimide-β-acetic acid, or N-alkylglutarimide-β-acetic acid.

---

This invention relates to a new class of metal compounds and to a method of their preparation, the compounds being characterized as the reaction products of certain metal compounds with glutarimide-β-acetic acid.

It is still another object of this invention to provide novel metal derivatives of glutarimide-β-acetic acid.

It is another object of this invention to provide mercuric derivatives of glutarimide-β-acteic acid.

It is still another object of this invention to provide processes for preparing said novel compounds.

Other objects and advantages of the invention will in part be obvious and in part appear hereinafter.

This invention accordingly is embodied in novel metal derivatives of glutarimide-β-acetic acid. These compounds are prepared by reacting glutarimide-β-acetic acid, an ester of glutarimide-β-acetic acid, or a N-substituted derivative of glutarimide-β-acetic acid, with a compound of a Group II–B metal of the periodic classification of the elements. These Group II–B metal compounds are the mono- or di-salts of the metal. Using mercury for illustrative purposes, typical reactions are mercuric acetate and ethylmercuric acetate. The mercury compound reacts by splitting the bonds from the mercury atom to atoms other than carbon (if any), and reacts these now unsaturated valence site(s) with the glutarimide-β-acetic acid (or derivative thereof).

Reaction with an ester of the glutarimide-β-acetic acid, results in the preparation of a N-mercuric derivative of the glutarimide-β-acetic acid ester. When the reaction is with the N-substituted glutarimide-β-acetic acid rather than with an ester, the mercury atom replaces the acid hydrogen of the glutarimide-β-acetic acid. Consequently the invention may be broadly divided into two sub-generic groups, dependent upon whether the metal atom is bonded to the nitrogen atoms, or to the acid end of the glutarimide-β-acetic acid moiety. However, it will become apparent from the more detailed disclosure hereinafter, that this clear-cut distinction cannot always be made.

Those novel compounds in which the metal atom is bonded to the nitrogen atom to form N-metal derivatives of the glutarimide-β-acetic acid may be shown in conventional fashion by the following representation (I):

I
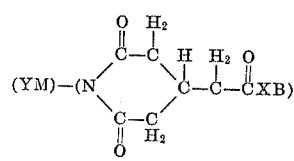

wherein M is a Group II–B metal; X is oxygen or sulfur; B is an esterifying group; and Y is an organic group, or a repetition of the glutarimide-β-acetic acid ester moiety bounded by the paratheses of the formula. Y will be an organic group when the metal reactants is an organo-metal mono-salt of the metal, e.g., ethylmercuric acetate. The preferred organic groups are lower alkyls, lower alkenyls, monocyclicaryls, and bicyclicaryls. The bis derivative of the metal is formed when the metal reactant is the di-salt, e.g., mercuric acetate.

When utilizing glutarimide-β-acetic acid as the reactant, the resultant metal derivative may be shown in conventional fashion by the following representation (II):

II
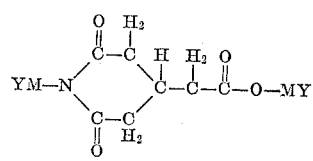

When utilizing as the glutarimide-β-acetic acid reactant, one having the active hydrogen on the nitrogen atom substituted with an organic group such as the lower alkyl group (A), the resultant compound may be shown in conventional fashion by the following representation (III):

III
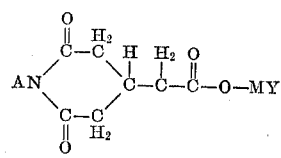

The glutarimide-β-acetic acid reactant is also known as 2,6-dioxo-4-piperidine-β-acetic acid. These compounds may carry one or more common substituents such as the alkyls, alkoxys, halides, etc., in place of one or more of the hydrogen atoms bonded to the carbon atoms. As is apparent from Formula I, when X is sulfur, the reactant esters are not, strictly speaking, esters of glutarimide-β-acetic acid, but are the corresponding esters of the thio acid, i.e., the esters of glutarimide-β-ethanethiolic acid. The esterifying group B is preferably an alkyl group having up to about 18 carbon atoms, or a monocyclicaryl group. These groups may also carry one or more common substituents such as the alkyls, alkoxys, halides, amines, etc. The metal derivatives of such substituted glutarimide acetic acid compounds, including the corresponding thio esters are considered to be the equivalent of the glutarimide acetic acid and esters thereof illustrated herein and are meant to be encompassed within the scope of said term specified in the claims. The preparation of certain of the reactant derivatives of said acid is disclosed in an application of N. A. Starkovsky entitled "Derivatives of Glutarimide-β-Acetic Acid," Ser. No. 421,115, filed Dec. 24, 1964, which is hereby incorporated herein in its entirety.

This specification discloses novel esters, thioesters, and nitrogen derivatives of glutarimide-β-acetic acid having the formula

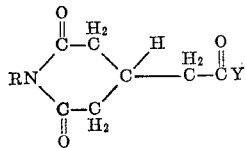

wherein Y may be

I        —XB

II 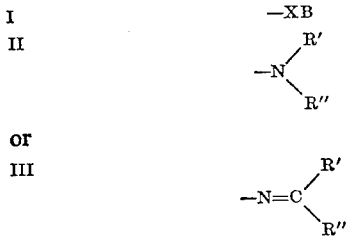

or

III

These novel derivatives of glutarimide-β-acetic acid may be subdivided into three sub-genera, the first embodying the esters and thioesters having the general formula I 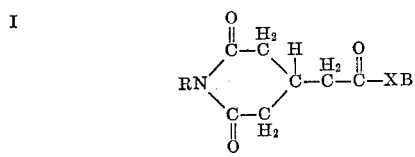

wherein X as, oxygen or sulfur, and B is an esterifying group. As is apparent from the formula, when X is sulfur, the esters are not, strictly speaking, esters of the glutarimide-β-acetic acid. They are the corresponding esters of glutarimide-β-ethane thiolic acid. Most of the esterifying groups contemplated are included within the following more specific definition of B, i.e., alkyl groups having 1 to 18 carbon atoms, such as hexyl, lauryl, and dodecyl; alkenyl groups having 1 to 18 carbon atoms, such as allyl, propenyl, and oleyl; and monocyclic and bicyclic aryls such as phenyl and naphthyl; and hetero rings such as thiazole, imidazole, pyrazole, pyridine and isoquinoline. R may be hydrogen, alkyls having 1 to 18 carbon atoms, alkenyls having 1 to 18 carbon atoms, or monocyclicaryls.

The nitrogen derivatives of the glutarimide-β-acetic acid are the amides and N-acylimino derivatives having the respective formula

II

III

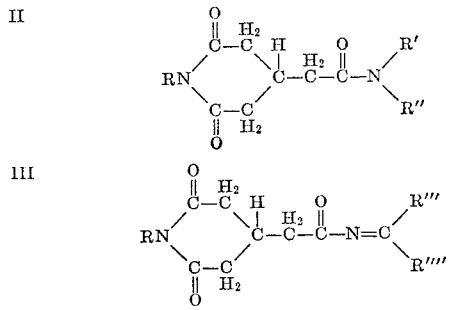

wherein R', R'', R''' and R'''' may be hydrogen, alkyls having 1 to 18 carbon atoms, alkenyls having 1 to 18 carbon atoms such as oleyl, monocyclic and bicyclic aryls such as naphthyl, etc. R''' and R'''' may also be bridged to form cyclic structures. They may also be replaced by other atoms that are part of a hetero ring system. Illustrative acetylimino derivatives include those where R''' and R'''' together are derived from imidazole, pyrazole, pyridine, isoquinoline and thiazole as illustrated in Compound 28.

The R group bonded to the cyclic nitrogen in the glutarimide moiety is hydrogen or an alkyl group having 1 to 18 carbon atoms, an alkenyl group having 1 to 18 carbon atoms or a monocyclicaryl such as chlorophenyl. These groups include substituted groups where one or more substituents is on the No. 1 or subsequent carbon atoms. When utilizing rigorous chemical nomenclature, the presence of such substituent group(s) may change the "alkyl" from a "substituted alkyl" to a group such as an acyl group, thioacyl group, or aroyl group, etc. The scope and variety of such substituents is apparent from the claims and is meant to be included within the scope of the terms "alkyl," "alkenyl," and "monocyclicaryl."

The various groups within the definition of R, R', R'', R''', R'''' and B, may also carry one or more common substituent, such as the alkyls, aryls, alkoxys, halides, amines etc. The hydrogen atoms on the carbon atoms of the glutarimide-β-acetic acid moiety also may be replaced by such common substituent groups. All such substituted compounds are considered to be the equivalents of the various derivatives of glutarimide-β-acetic acid illustrated herein.

The esters and thioesters are prepared by reacting a glutarimide-β-acetyl halide, in a non-hydroxylic solvent such as dioxane, ether, benzene, tetrahydrofuran, N-dimethylformamide, etc., and preferably in a solution of dioxane with the desired alcohol, or corresponding mercaptan to produce the ester or thioester.

The amides are prepared by reacting a glutarimide-β-acetyl halide in a non-hydroxy solvent, such as one of those mentioned above, and preferably in a solution of dioxane and in the presence of one and one-half of a tertiary amine, such as pyridine, with an amine, i.e., ammonia or the desired primary or secondary amine.

The N-acylimino derivatives are prepared by reacting a glutarimide-β-acetyl halide in a non-hydroxylic solvent, such as one of those mentioend above with the desired imino compound of general formula

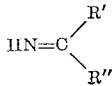

Esters, thioesters, amides, and N-acylimino derivatives prepared by the described method, and having R=H, may have the hydrogen atom replaced, if desired, by an alkyl, acyl, aroyl, etc. group by the use of conventional alkylation, acylation, aroylation, etc. procedures. It is to be understood that when esters, thioesters, amides, or N-acylimino derivatives contain other active groups reactive with alkylating, acylating, or aroylating agents, reactions with these agents may lead to the introduction of more than one R substituent in the esters, thioester, amides and N-acylimino derivatives. Thus when alkylating an amide derivative of glutarimide-β-acetic acid wherein both R and R' are hydrogen, alkylation will occur at both sites under specified conditions.

Reference to the following specific compounds will give an accurate indication of the process steps involved in the formation of these esters, thioesters, amides, and N-acylimino derivatives, as well as an indication of the nature of these materials.

COMPOUND 1

The preparation of the aliphatic esters and thio esters of glutarimide-β-acetic acid is illustrated in the preparation of the methyl ester. 20 grams of glutarimide-acetyl chloride in 200 ml. of dioxane was treated dropwise (while being cooled in an ice bath) with one equivalent of methyl alcohol (as such, or as a solution, in dioxane). The reaction mixture was allowed to stand at room temperature, usually overnight, and then was distilled under reduced pressure until a thick syrup or a mass of crystals was obtained. The reaction product 4-piperidineacetic acid: 2,6-dioxo-, methyl ester $C_8H_{11}NO_4$, M.P. 70–72° C. (yield, 90%) was crystallized from methylene-chloride, ether, or ether-petrol (B.P. 60–80° C.).

COMPOUNDS 2–11

The foregoing procedure was used to prepare the specified products.

COMPOUNDS 12–18

The preparatory process of the aryl and thioaryl esters of Compounds 12–18 follows: 20 grams of phenol was dissolved in a sufficient amount of dioxane to keep it in solution at room temperature (50–250 ml.). One equivalent of gluartimide-β-acetyl chloride was added in the form of a 15% by weight solution in dioxane. The cooled mixture was then slowly treated with 1½ equivalents (weight ratio to glutarimide-β-acetyl chloride) of dry pyridine. After standing at room temperature overnight, the reaction mixture was poured into 1 to 2 liters of ice cold water. Usually, the ester separated out as a white solid. In preparations where the solid did not separate, or gave a sticky material, then the aqueous mixture was exhaustively extracted with methylene chloride. The combined organic extracts were washed with several portions of water, evaporated to dryness under reduced pressure. The residue was crystallized from aqueous alcohol or acetone-petrol (B.P. 60–80° C.).

| Compound: | Product | Formula | Melting Point, ° C. | Yield, Percent |
|---|---|---|---|---|
| 12 | 4-piperidineacetic acid:2,6-dioxo-, phenyl ester | $C_{13}H_{13}NO_4$ | 150 | 75 |
| 13 | 4-piperidineacetic acid:2,6-dioxo-, p-tolyl ester | $C_{14}H_{15}NO_4$ | 180 | 85 |
| 14 | 4-piperidineacetic acid:2,6-dioxo-, p-chlorophenyl ester | $C_{13}H_{12}ClNO_4$ | 146 | 78 |
| 15 | 4-piperidineacetic acid:2,6-dioxo-, 2,4-dinitrophenyl ester | $C_{13}H_{11}N_3O_8$ | 178 | 60 |
| 16 | 4-piperidineacetic acid:2,6-dioxo-, 2,4,6-trichlorophenyl ester | $C_{13}H_{10}Cl_3NO_4$ | 178 | 71 |
| 17 | 4-piperidineacetic acid:2,6-dioxo-, pentachlorophenyl ester | $C_{13}H_8Cl_5NO_4$ | 216–218 | 80 |
| 18 | 4-piperidineacetic acid:2,6-dioxo-, p-chlorothiophenyl ester | $C_{13}H_{12}ClNO_3S$ | 148 | 98 |

COMPOUND 19

When 8-hydroxyquinoline was reacted with glutarimide-β-acetyl chloride under the conditions of Compounds 12–18, 4-piperidineacetic acid:2,6-dioxo-, 8-quinolinyl ester, hydrochloride, $C_{16}H_{14}N_2O_4$, HCl, M.P. 190° C. (yield, 92%) was obtained. When this hydrochloride (20 grams) dissolved in 200 ml. of water was treated with excess of aqueous sodium bicarbonate solution (200–500 ml.), the crystalline base 4-piperidineacetic acid:2,6-dioxo-, 8-quinolinyl ester, $C_{16}H_{14}N_2O_4$, M.P. 205° C. (yield, 95%) separated out.

The preparatory process of aliphatic and aromatic primary and secondary and tertiary amides is illustrated in the following compounds.

COMPOUND 20

20 grams of n-hexylamine was dissolved in 200 ml. of dioxane. Two equivalents (ratio to n-hexylamine) of dry pyridine were added, followed by one equivalent (ratio to n-hexylamine) of glutarimide-β-acetyl chloride in the form of a 15% by weight solution in dioxane. The latter addition was carried out slowly, with stirring and cooling in an ice-bath. The reaction mixture was allowed to stand at room temperature, usually overnight, and was then diluted with 0.5 to 2 liters if ice cold water. A mass of crystals was obtained. The reaction product, 4-piperidineacetic acid:2,6-dioxo-, n-hexyl amide, $C_{13}H_{22}N_2O_3$, M.P. 138° C. (yield, 63%) was crystallized from acetone or alcohol.

| Compound: | Product | Formula | Melting Point, ° C. | Yield, Percent |
|---|---|---|---|---|
| 2 | 4-piperidineacetic acid:2,6-dioxo-, ethyl ester | $C_9H_{13}NO_4$ | 73 | 84 |
| 3 | 4-piperidineacetic acid:2,6-dioxo-, isopropyl ester | $C_{10}H_{15}NO_4$ | 89 | 80 |
| 4 | 4-piperidineacetic acid:2,6-dioxo-, n-butyl ester | $C_{11}H_{17}NO_4$ | 71 | 90 |
| 5 | 4-piperidineacetic acid:2,6-dioxo-, n-hexyl ester | $C_{13}H_{21}NO_4$ | 47 | 51 |
| 6 | 4-piperidineacetic acid:2,6-dioxo-, n-decyl ester | $C_{17}H_{29}NO_4$ | 62 | 95 |
| 7 | 4-piperidineacetic acid:2,6-dioxo-, n-dodecyl ester | $C_{19}H_{33}NO_4$ | 74 | 74 |
| 8 | 4-piperidineacetic acid:2,6-dioxo-, S-ethyl ester | $C_9H_{13}NO_3S$ | 89 | 65 |
| 9 | 4-piperidineacetic acid:2,6-dioxo-, S-2-dimethylamino-ethyl ester, hydrochloride | $C_{11}H_{19}ClN_2O_3S_3$ | 236–8 | 70 |
| 10 | 4-piperidineacetic acid:2,6-dioxo-, benzyl ester | $C_{14}H_{15}NO_4$ | 131 | 85 |
| 11 | 4-piperidineacetic acid:2,6-dioxo-, allyl ester | $C_{10}H_{13}NO_4$ | 58 | 77 |

COMPOUND 21

A solution of 24 grams of glutarimide-β-acetyl chloride in 150 ml. of dioxane was saturated with methylamine gas at 0° C. Excess of methylamine was then blown out by a stream of air, and the mixture was diluted with its volume of water and concentrated under reduced pressure to a small volume. The reaction product, 4-piperidineacetic acid:2,6-dioxo-, methyl amide $C_8H_{12}N_2O_3$, M.P. 264° (yield, 50%) separated out as white crystalline material.

COMPOUNDS 22–27

The procedure of Compound 20 was used to prepare the specified products of Compounds 22–27.

Following the foregoing procedure, the following four compounds are prepared:

2-[N-ethylglutarimide-β-acetylimino]-3-ethyl-Δ$^4$-thiazoline

| Product | | Compound derived from [1] | Formula | Melting Point, °C. | Yield, Percent |
|---|---|---|---|---|---|
| Compound: | | | | | |
| 22 | 4-piperidineacetic acid:2,6-dioxo-, n-dodecyl amide | n-Dodecylamine | $C_{19}H_{33}N_2O_3$ | 153 | 98 |
| 23 | 4-piperidineacetic acid:2,6-dioxo-, 2',4'-dichloranilide | 2,4-dichloro-aniline | $C_{13}H_{12}Cl_2N_2O_3$ | 239 | 79 |
| 24 | 4-piperidineacetic acid:2,6-dioxo-, bicyclohexyl amide | Bicyclohexylamine | $C_{19}H_{29}N_2O_3$ | 170 | 58 |
| 25 | 4-piperidineacetic acid:2,6-dioxo-, allyl amide | Allylamine | $C_{10}H_{14}N_2O_3$ | 143 | 80 |
| 26 | 4-piperidineacetic acid:2,6-dioxo-, cyclohexyl amide | Cyclohexyl-amine | $C_{13}H_{20}N_2O_3$ | 207 | 68 |
| 27 | 4-piperidineacetic acid:2,6-dioxo-, hydrazide | Hydrazine | $C_7H_{11}N_3O_3$ | 147 | 90 |

[1] Although the name of this compound is implicit in product's name, it is included here for clarity sake.

The preparatory process of N-acylimino derivatives is illustrated in the following compound.

Compound 28

10 grams of 2-imino-3-methyl-Δ$^4$-thiazoline (prepared by the method of R. Dahlbom and T. Ekstrand Svensk, Kem. Tid. 55, 122–5 (1943); Chem. Zentr. 1943, II, 1188) was acylated with glutarimide-β-acetyl chloride following the method of Compound 20 to give colorless crystalline 2-(glutarimide-β-acetylimino) - 3 - methyl - Δ$^4$-thiazoline $C_{11}H_{13}N_3O_3S$, M.P. 188° (from tetrahydrofuran-petrol); yield, 45%.

The same product M.P. 188° was obtained when a mixture of 10 grams of 4-piperidineacetic acid:2,6-dioxo-, 2 thiazolyl amide, 20 ml. of methyl iodide, and 100 ml. of dry dimethylacetamide was heated with stirring at 90–100° for 20 minutes, then stirred at room temperature, usually overnight, evaporated to a solid under reduced pressure, and this solid powdered and stirred with a large excess of saturated sodium bicarbonate solution, usually overnight. The product which separated was filtered, washed with water, and crystallized from tetrahydrofuran petrol to give colorless crystals of 2-(gluarimide-β-acetylimino)-3-methyl-Δ$^4$-thiazoline. Wield, 75%.

The preparatory process of aliphatic esters and thioesters, aryl and thioaryl esters, aliphatic and aromatic primary, secondary and tertiary amides, and N-acylimino derivatives of glutarimide-β-acetic acid with a substituent other than hydrogen on the nitrogen of the glutarimide ring is illustrated in the following compounds.

COMPOUND 29

20 grams of 4-piperidineacetic acid:2,6-dioxo-, isopropyl ester (product of Compound 3), dissolved or suspended in dry acetone (100–500 ml.) was treated with an excess (usually 1.2 to 3 equivalents) of methyl iodide and 20–50 g. of finely powdered anhydrous potassium carbonate. The reaction mixture was refluxed, usually overnight, then filtered from the inorganic salts, and evaporated to dryness under reduced pressure. The reaction product, which was an oil, was distilled under reduced pressure to give 4-piperidineacetic acid:1-methyl-2,6-dioxo-, isopropyl ester, $C_{11}H_{17}NO_4$, B.P. 138° C. (0.50 mm.) yield 50%.

COMPOUND 30

When the procedure of Compound 29 was applied to the methylation of 2-(glutarimide-β-acetylimino)-3-methyl-Δ$^4$-thiazoline (product of Compound 28), the reaction product (90% yield) was crystalline 2-(N-methylglutarimide-β-acetylimino)-3-methyl-Δ$^4$-thiazoline, $C_{12}H_{15}N_3O_3S$, M.P. 145–146° C.

2-[N-allylglutarimide-β-acetylimino]-3-methyl-Δ$^4$-thiazoline

2-[N-benzylglutarimide-β-acetylimino]-3-methyl-Δ$^4$-thiazoline

2-[N-allylglutarimide-β-acetylimino]-3-allyl-Δ$^4$-thiazoline

COMPOUNDS 31–36

The procedure of Compound 29 was used to prepare the specified products of Compounds 31–36. The starting materials were compounds obtained as product of Compounds 1–28, and other compounds falling in the scope of this patent application and illustrated by Compounds 1–28. The halides used were usually, but not necessarily, iodides, as the same results were obtained with chlorides and bromides, provided a catalytic amount (usually 1 g.) of sodium iodide was added to the reaction mixture from the start. The reaction products were distilled in vacuum if they were liquid, and crystallized from alcohol, acetone, ether, or any other suitable solvent if they were solid.

| Product | | Formula | Melting Point, °C. | Boiling Point | Yield, Percent |
|---|---|---|---|---|---|
| Compound: | | | | | |
| 31 | 4-piperidineacetic acid:1-allyl-2,6-dioxo-, isopropyl ester | $C_{13}H_{19}NO_4$ | | 150° (0.16 min.) | 75 |
| 32 | 4-piperidineacetic acid:1-allyl-2,6-dioxo-, ethyl ester | $C_{12}H_{17}NO_4$ | | 148° (0.12 min.) | 80 |
| 33 | 4-piperidineacetic acid:1-allyl-2,6-dioxo-, benzyl ester | $C_{17}H_{19}NO_4$ | | 220° (0.25 min.) | 95 |
| 34 | 4-piperidineacetic acid:1-allyl-2,6-dioxo-, allyl amide | $C_{13}H_{18}N_2O_3$ | 73 | | 73 |
| 35 | 4-piperidineacetic acid:1-benzyl-2,6-dioxo-, ethyl ester | $C_{16}H_{19}NO_4$ | 92 | | 90 |
| 36 | 4-piperidineacetic acid:1-carbethoxymethyl-2,6-dioxo-, n-dodecyl amide | $C_{23}H_{40}N_2O_5$ | 80 | | 65 |

COMPOUND 37

The following represents one method used for the introduction of an acyl or aroyl group R in the glutarimide ring of compounds illustrated in Compounds 1–28.

20 grams of 4-piperidineacetic acid:2,6-dioxo-, 8-quinolinyl ester (product of Compound 19) was refluxed with 200 ml. of acetic anhydride and 40 grams of anhydrous sodium acetate usually overnight. The cooled reaction product was then added to 2 liters of ice cold water. After completion of the hydrolysis of unreacted acetic anhydride, the solution was neutralized with sodium bicarbonate and extracted with methylene chloride. Evaporation of the solvent gave an oil, which was purified by solution in acetone and precipitation with petrol. The amorphous 4-piperidineacetic acid:2,6-dioxo - 1 - acetyl-, 8-quinolinyl ester thus obtained, $C_{18}H_{16}N_2O_5$ melted at 24–27° C.; yield: 78%.

COMPOUND 38

The following represents a second method for the introduction of an acyl or aroyl group R in the glutarimide ring of compounds illustrated in Compounds 1–28.

15.5 grams of 4-piperidineacetic acid:2,6-dioxo-, ethyl ester (product of Compound 2) dissolved in 100–200 of dry toluene was added to 1.8 g. (1 equivalent) of sodium metal powdered under toluene. The mixture was stirred while the temperature was slowly brought up to 100° (oil-bath). Thereupon, a white suspension of the N-Na salt was obtained. The mixture was cooled in an ice-bath and treated with 9 ml. (one equivalent) of benzoyl chloride. After allowing the mixture to stand at room temperature, usually overnight, and then keeping it at 100° C. for one hour to complete the reaction, the precipitated sodium chloride was removed by filtration and the filtrate evaporated under reduced pressure to 4-piperidine acetic acid:2,6 - dioxo - 1 - benzoyl-, ethyl ether, $C_{16}H_{17}NO_5$, which aws a glassy material below 0° C. and a thick syrup at room temperature (yield, 85%).

COMPOUND 39

Replacing benzoyl chloride by an equivalent amount of $Cl_3CSCl$ (trichlorothioacetyl chloride) in Compound 38 gave 4 - piperidineacetic acid:1 - trichloromethylthioaceto-2,6-dioxo-, ethyl ester, $C_{10}H_{12}Cl_3NO_4S$, appearing as a glass below 0° C. and a thick syrup at room temperature (yield, 95%).

Many of these derivatives of glutarimide-β-acetic acid have biocidal activity. Compound 3 was found to be active against coccidia in the intestines of fowl. Certain of the derivatives e.g. the dodecyl ester, the phenolic ester (esters of phenol, catechol, and the thioesters, e.g. Compound 7, exhibited fungicidal activity. The phenyl esters also exhibited insecticidal properties. In addition to the utility of these derivatives, as aforesaid, they are also useful as intermediates in the preparation of mercury derivatives of these materials. Such mercury derivatives are prepared by reacting the respective glutarimide-β-acetic acid ester or thioester (dissolved in alcohol) with mercuric acetate. The product mercury compounds have a wide range of uses, e.g. fungicides and slimicide.

The allyl derivatives, i.e., R, R' and/or R'' are allyl, may be reacted with mercuric acetate in methanol to yield compounds in which the allylic group ($-CH_2CH_2=CH_2$) become

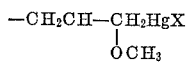

where X is acetate. It could also be chloride, hydroxide, etc. Illustrative mercurated products, follow. The product of Compound 33 would become

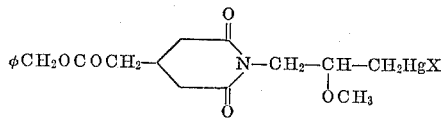

of Compound 34

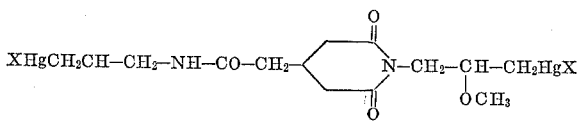

The compounds of Group II–B metal elements used in the preparation of the novel compounds herein, are the compounds of mercury, zinc and cadmium. One organic group may be bonded to the metal atom. These groups include the lower alkyls and lower alkenyls such as ethyl, butyl, octyl, vinyl; and the mono- and dicyclic aryls such as phenyl, tolyl, naphthyl, etc. These organo groups may carry common substituents such as halogens, hydroxyl, ether groups, etc. The metal compound reactants are salts of the metal. The anions with which the metal may be associated include oxide, acetate, carboxylic acid residues generally and particularly those having up to about 18 carbon atoms.

Typical compounds which can be used to react with the glutarimide-β-acetic acid reactant in accordance with this invention are the following: ethylmercuric chloride, ethylmercuric acetate, bis(ethylmercuric)phosphate, 2-methoxyethylmercuric acetate, phenylmercuric acetate, phenylmercuric chloride, methylmercuric hydroxide; ethylzinc iodide, propylzinc bromide, p-fluorophenylzinc bromide, p-chlorophenylzinc iodide, β-naphthylzinc bromide, bis(diethylzinc)oxide, methylzinc methylate; phenylcadmium halide and methylcadmium halide.

Reference to the following examples will give an accurate indication of the process steps involved in the formation of these novel derivatives of glutarimide-β-acetic acid, as well as an indication of the nature of these materials.

Examples 1–8

N-mercury derivatives of gutarimide-β-acetic acid were prepared using the following procedure: The respective ester or thioester (10 g.) dissolved in the minimum volume of methanol containing a trace of acetic acid, was treated with one equivalent of mercuric acetate, also dissolved in a minimum volume of the same solvent. Usually, the mercuric derivative crystallized out spontaneously upon standing for a few minutes; if not, the reaction mixture was concentrated at room temperature under reduced pressure until crystals proceeded to separate out. The compounds of Examples 1–8 were prepared following the foregoing procedure. These compounds are colorless crystalline materials slightly soluble in water and moderately to fairly soluble in dioxane and aliphatic alcohols. They have the general structure

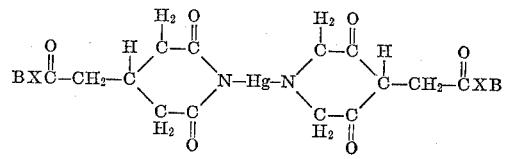

| Example: | Compound | Formula | M.P., °C. | Yield, Percent |
|---|---|---|---|---|
| 1 | 4-piperidineacetic acid:1,1'-mercuribis(2,6-dioxo-, ethyl ester) | $C_{18}H_{24}HgN_2O_8$ | 145 | 82 |
| 2 | 4-piperidineacetic acid:1,1'-mercuribis(2,6-dioxo-, n-butyl ester) | $C_{19}H_{32}HgN_2O_8$ | 122–4 | 78 |
| 3 | 4-piperidineacetic acid:1,1'-mercuribis(2,6-dioxo-, n-hexyl ester) | $C_{28}H_{40}HgN_2O_8$ | 128 | 90 |
| 4 | 4-piperidineacetic acid:1,1'-mercuribis(2,6-dioxo-, n-decyl ester) | $C_{34}H_{56}HgN_2O_8$ | 130 | 85 |
| 5 | 4-piperidineacetic acid:1,1'-mercuribis(2,6-dioxo-n-dodecyl ester) | $C_{38}H_{62}HgN_2O_8$ | 140 | 90 |
| 6 | 4-piperidineacetic acid:1,1'-mercuribis(2,6-dioxothio-, S,S'-di-ethyl ester) | $C_{18}H_{24}HgN_2O_6S_2$ | 175 | 92 |
| 7 | 4-piperidineacetic acid:1,1'-mercuribis (2,6-dioxo-2,4,6-tri-chlorophenyl ester) | $C_{26}H_{16}Cl_6HgN_2O_8$ | 227–8 | 51 |
| 8 | 4-piperidineacetic acid:1,1'-mercuribis(2,6-dioxo-penta-chlorophenyl ester) | $C_{26}H_{14}Cl_{10}HgN_2O_8$ | 274 | 69 |

Example 9

A polymeric derivative of glutarimide-β-acetic acid was prepared by heating 20 gms. of the said acid in 600 ml. of warm methanol containing 1 ml. of acetic acid, with two equivalents of mercuric acetate in the same volume of methanol. The N-mercuric salt, $C_7H_7HgNO_4$, softening above 200° C., and believed to have the formula illustrated below, separated out in a 92% yield. This material was amorphous and apparently polymeric. It was sparingly soluble in all common solvents.

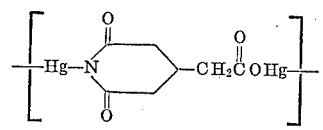

The corresponding monomer containing two Hg atoms is obtained when ethylmercuric acetate is used in place of mercuric acetate.

Example 10

4-piperidineacetic acid:2,6-dioxo-, phenylmercury ester, N-ethyl derivative is prepared by treating the N-ethyl derivative of glutarimide-β-acetic acid (10 g.) dissolved in the minimum volume of methanol with one equivalent of phenylmercury acetate in 25 ml. of methanol, allowing the solution to stand, and then evaporating to dryness in vacuum at 20° C., to produce the crude solid.

Example 11

4-piperidineacetic acid:2,6-dioxo-, phenylmercury ester, N-mercury phenyl derivative was prepared by treating triethyltin glutarimidyl-β-acetate (0.152 g.) in 5 ml. of methanol with two equivalents of phenylmercuric acetate (0.272 g.) in 50 ml. of the same solvent, allowing the solution to stand for 30 minutes, and evaporating to dryness in vacuum at 20° C. The crude solid thus obtained was purified by recrystallization from 80% methanol to 280 mg. of colorless prisms, M.P. 209–210. The above compound may also be named phenylmercuric N-phenylmercury-glutarimidyl-β-acetate.

Example 12

4-piperidineacetic acid:2,6-dioxo-, ethyl ester, N-mercury phenyl derivative was prepared by treating 10 grams of the reactant ethyl ester (dissolved in the minimum volume of methanol) with one equivalent of phenylmercuric acetate (also dissolved in a minimum volume of methanol). The mercuric derivative crystallizes spontaneously upon standing in the cold for a few hours. The aforementioned product ($C_{15}H_{17}HgNO_4$), M.P. 97–99° C., was prepared in a yield of 80%.

Referring back to the formulae and the illustrative preparatory procedures it is of course evident that the corresponding metal halides may be used in place of the metal acetate illustrated. When using the metal halide, the alkali metal or alkaline metal salts of glutarimide-β-acetic acid would be the preferred reactant. When the acid is utilized, hydrogen halide or water is removed from the sphere of the reaction during the synthesis. When the glutarimide-β-acetic acid ester is used as the reactant, the metal salts are preferred to form the desired product. In all the syntheses, approximately stoichiometric proportions of the reactants may be used. The solvents or the system may include water, ethanol, etc.

Although mercury compounds have been used in generally illustrating the synthesis and in the examples, the other metals of Group II–B of the periodic classification of elements may also be used, namely zinc and cadmium, to form the corresponding derivatives of glutarimide-β-acetic acid.

The solid compounds formed in accordance with this invention may be reduced to fine degrees of subdivision and have considerable value as fungicides and slimicides. Testing indicates activity against tomato early blight, brown rot fungus, *Aerobacterium aerogenes*, *Salmonella typhoso*, *Staphylococcus aureus*, *Aspergillus terreus*, *Pullularia pullulans*, and other fungi and microorganisms. Because of these unique properties these materials may be used as paint additives, anti-fouling agents, wood preservatives, catalysts, etc.

As many embodiments of this invention may be made without departing from the spirit and scope thereof, it is to be understood that the invention includes all such modifications and variations as come within the scope of the appended claims.

What is claimed is:

1. The method of preparing metal derivatives of glutarimide-β-acetic acid which comprises reacting up to two moles of a compound having the formula;

YHgQ wherein Q is a carboxylic group having up to 18 carbon atoms, and Y is selected from the group consisting of lower alkyl, lower alkenyl, monocyclicaryl and dicyclicaryl, and Q;
per mole of compound selected from the group consisting of glutarimide-β-acetic acid and N-alkylglutarimide-β-acetic acid wherein said alkyl is an unsubstituted lower alkyl.

2. A compound having a formula given by the following:

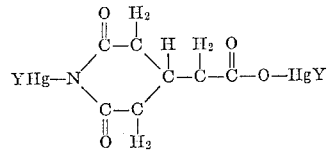

wherein Y is selected from the group consisting of lower alkyl, lower alkenyl, monocyclicaryl and dicyclicaryl.

3. A compound having a formula given by the following:

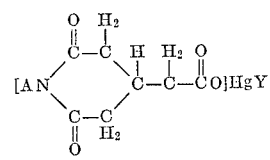

wherein:
Y is selected from lower alkyl, lower alkenyl, monocyclicaryl, dicyclicaryl, and a repetition of the glutarimide-β-acetic acid ester moiety bounded by the brackets; and
A is an unsubstituted lower alkyl group.

4. A polymeric material having the formula $C_7H_7HgNO_4$, a softening point above 200° C., prepared by reacting glutarimide-β-acetic acid with mercuric acetate.

5. 4-piperidineacetic acid:1,1'-mercuribis(2,6 - dioxo-, ethyl ester).

6. 4-piperidineacetic acid:1,1'-mercuribis(2,6 - dioxo-, n-butyl ester).

7. 4-piperidineacetic acid:1,1'-mercuribis(2,6 - dioxo-, n-hexyl ester).

8. 4-piperidineacetic acid:1,1'-mercuribis(2,6 - dioxo-, n-decyl ester).

9. 4-piperidineacetic acid:1,1'-mercuribis(2,6 - dioxo-, n-dodecyl ester).

10. 4-piperidineacetic acid:1,1'-mercuribis(2,6 - dioxo-thio-,S,S'-diethylester).

11. 4-piperidineacetic acid:1,1'-mercuribis(2,6 - dioxo-, 2,4,6-trichlorophenyl ester).

12. 4-piperidineacetic acid:1,1'-mercuribis(2,6 - dioxo-, pentachlorophenyl ester).

13. 4-piperidineacetic acid:2,6-dioxo-, phenyl mercury ester, N-ethyl derivative.

14. 4-piperidineacetic acid:2,6 - dioxo, phenylmercury ester, N-mercury phenyl derivative.

15. 4-piperidineacetic acid:2,6-dioxo-, ethyl ester, N-mercury phenyl derivative.

References Cited

UNITED STATES PATENTS 2,822,312  2/1958  Bretscher et al. _____ 260—2 X
3,337,551  8/1967  Faith _____ 260—281 X ALEX MAZEL, *Primary Examiner*.

D. G. DAUS, *Assistant Examiner*.

U.S. Cl. X.R.

260—270, 2, 281, 289, 306.7, 309.6, 310, 999, 431, 434, 429.9, 429; 106—288; 21—7